Nov. 20, 1923.  
W. MEYER  
1,474,978  
RIVET SET  
Filed Jan. 20, 1920
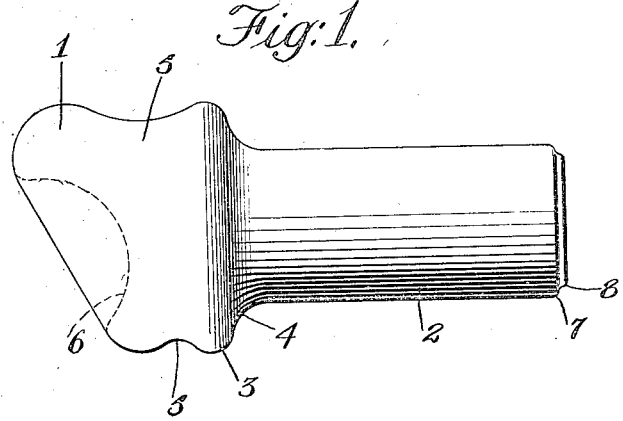
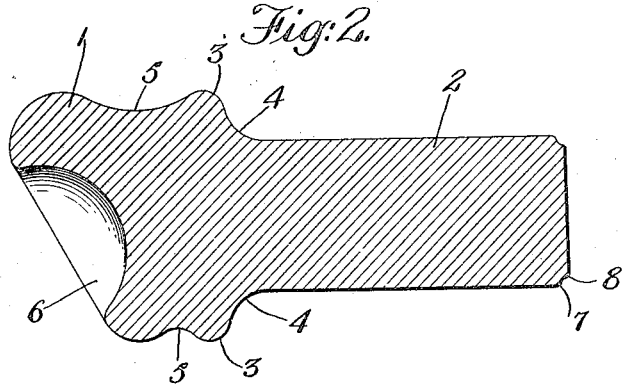
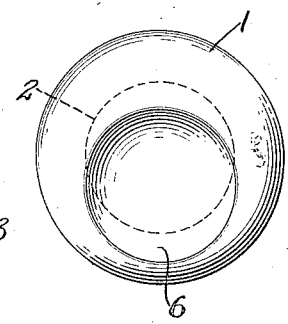
Inventor  
Waldemar Meyer  
By his Attorney Patented Nov. 20, 1923.

1,474,978

UNITED STATES PATENT OFFICE.

WALDEMAR MEYER, OF WOODHAVEN, NEW YORK.

RIVET SET.

Application filed January 20, 1920. Serial No. 352,760.

*To all whom it may concern:*

Be it known that I, WALDEMAR MEYER, a citizen of the United States, and resident of Woodhaven, in the county of Queens and State of New York, have invented certain new and useful Improvements in Rivet Sets, of which the following is a specification.

This invention relates to rivet sets for use in riveting hammers.

In general, rivet sets fail by breakage where the shank joins the body, or in the groove where the riveter jaws engage the set. Where such breakage does not occur the end of the shank under the repeated blows of the piston upsets, splits or chips. One of the objects of this invention is to provide a tool that is free from breakage at the junction of the shank and the body and one that will drive a larger number of rivets before upsetting, splitting or chipping and one that when chipping does take place will not wedge the chip between the shank and the cylinder or bore.

Another object of the invention is to provide a set that will properly head a rivet in a corner or in places where obstructions prevent the alignment of the hammer and the rivet. With the usual form of rivet set, if the hammer and the shank of the rivet do not align, the head that is formed is not central with the shank and overlaps one side more than the other like a railroad tie spike. Such a rivet does not hold as well as a properly formed rivet.

Referring to the accompanying drawings:

Figure 1, is a view in elevation of a rivet set embodying the principles of my invention.

Figure 2, is a sectional view of Figure 1.

Figure 3 is an end view in elevation showing the positioning of the rivet heading recess.

I have discovered that if instead of cutting a groove with sharp corners, a curved depression is formed and if the body curves into the shank so that the profile of the body of the set is a series of reverse curves that breakage between the body and the shank is practically eliminated. I have also found that such a shaped set facilitates proper hardening. The reverse curves not only prevent breakage but also resist deformation. I have discovered that an ogee groove cut in the piston end of the shank materially resists upsetting or mushrooming in cases of improper hardening and in cases of correct hardening resists the tendency to chip under the repeated blows of the piston and when chipping does take place the reverse curves roll the chip in the groove instead of wedging it between the bore and the shank.

1 is the body of the rivet set joining the shank 2 by reverse curves 3 and 4. Body 1 has a curved depression 5 to receive the jaws of the rivet hammer and a rivet heading recess 6. Recess 6 is placed at an angle to shank 2. I have shown a 30 degree angle but it is obvious that any desired angle to avoid obstructions or when riveting in corners can be used, preferably not more than 45 degrees in order not to reduce too much the power of the blow of the piston. In order to permit the forming of the recess 6 at an angle to the shank 2, the riveting end of body 1 is cut away at the same angle or slope. The piston end of shank 2 has an ogee groove 7, 8 cut therein.

Referring to Figure 2, it will be seen that the contour of body 1 is a continuous curvilinear one having no sharp corners.

What I claim is:

1. In a rivet set, a shank, a body joining said shank and having a smooth continuously curved surface, and a rivet heading recess in said body.

2. In a rivet set, a shank, a body joining said shank and having a smooth continuously curved surface continuous with the surface of said shank, said body having a curved depression for the jaws of the riveter and having a rivet heading recess.

3. A rivet set comprising a shank, a body joined thereto and having a rivet heading recess in an end portion of the body, any longitudinal section through said head being devoid of sharp corners and comprising gradual curves.

4. A rivet set comprising a shank, a body joined thereto and provided with a depression in the sides of the body in which the jaws of the riveter are adapted to be received, and also having a rivet heading recess in an end portion of the body, a longitudinal section through any portion of said head and shank being devoid of sharp corners and comprising a number of gradual curves.

5. A rivet set comprising a shank, a body joined thereto and provided with a depression therein to receive the jaws of the riveter and also having a rivet heading recess in an end portion of said body, a longitudinal section through any portion of the head and shank being devoid of sharp corners and comprising a plurality of reverse curves.

6. In a rivet set, a shank and a body portion having a smoothly curved exterior surface and joined to said shank with a reverse curve, said body portion being devoid of sharp edges and having all portions thereof rounded and having a rivet heading recess in an end portion of the body.

Signed at New York, in the county of New York and State of New York, this 15th day of January A. D. 1920.

WALDEMAR MEYER.